(12) United States Patent
Dambrine et al.

(10) Patent No.: US 8,980,031 B2
(45) Date of Patent: Mar. 17, 2015

(54) METHOD OF FABRICATING A TURBINE ENGINE BLADE OUT OF COMPOSITE MATERIAL

(75) Inventors: Bruno Jacques Gerard Dambrine, Le Chatelet en Brie (FR); Thierry Godon, Sevran (FR); Dominique Magnaudeix, Yerres (FR)

(73) Assignee: SNECMA, Paris (FR)

(*) Notice: Subject to any disclaimer, the term of this patent is extended or adjusted under 35 U.S.C. 154(b) by 337 days.

(21) Appl. No.: 13/497,665

(22) PCT Filed: Sep. 16, 2010

(86) PCT No.: PCT/FR2010/051922
§ 371 (c)(1),
(2), (4) Date: Mar. 22, 2012

(87) PCT Pub. No.: WO2011/036380
PCT Pub. Date: Mar. 31, 2011

(65) Prior Publication Data
US 2012/0267039 A1 Oct. 25, 2012

(30) Foreign Application Priority Data
Sep. 24, 2009 (FR) ...................................... 09 04563

(51) Int. Cl.
*B29C 70/48* (2006.01)
*F01D 5/28* (2006.01)
*B29L 31/08* (2006.01)

(52) U.S. Cl.
CPC ................. *B29C 70/48* (2013.01); *F01D 5/282* (2013.01); *B29L 2031/082* (2013.01); *Y02T 50/672* (2013.01)

USPC ........................... 156/148; 156/242; 156/245

(58) Field of Classification Search
USPC ......................................... 156/242, 245, 148
See application file for complete search history.

(56) References Cited

U.S. PATENT DOCUMENTS 2,175,204 A * 10/1939 Lougheed ..................... 416/230
2,746,514 A *  5/1956 Warnken ...................... 156/581
2,830,647 A *  4/1958 Warnken ...................... 156/581

(Continued)

FOREIGN PATENT DOCUMENTS

| EP | 1526285 | 4/2005 |
| EP | 1777063 | 4/2007 |
| EP | 1801354 | 6/2007 |

OTHER PUBLICATIONS

International Search Report issued on Feb. 14, 2011 in PCT/FR10/051922 filed on Sep. 16, 2010.

*Primary Examiner* — Jeff Aftergut
(74) *Attorney, Agent, or Firm* — Oblon, McClelland, Maier & Neustadt, L.L.P.

(57) ABSTRACT

A method of fabricating a turbine engine blade out of composite material includes three-dimensionally weaving yarns to make a preform including root and airfoil portions that are connected together by oblique side faces for forming bearing surfaces enabling the root to bear against an assembly slot in a rotor disk. The method also includes compacting the preform in a mold having a cavity with first oblique side faces corresponding to the above-mentioned side faces of the preform, and second oblique side faces bearing against the root portion of the preform and at angles of inclination opposite to those of the first oblique side faces. Further, the method includes vacuum injecting a resin into the mold and polymerizing the resin.

12 Claims, 2 Drawing Sheets

(56) References Cited

U.S. PATENT DOCUMENTS

| | | | | |
|---|---|---|---|---|
| 2,859,936 | A | * | 11/1958 | Warnken ........................ 416/225 |
| 3,000,429 | A | * | 9/1961 | Warnken ........................ 156/494 |
| 5,013,216 | A | | 5/1991 | Bailey et al. |
| 5,939,006 | A | | 8/1999 | Wang et al. |
| 2005/0084377 | A1 | | 4/2005 | Dambrine et al. |
| 2006/0257260 | A1 | | 11/2006 | Dambrine et al. |
| 2007/0092379 | A1 | | 4/2007 | Coupe et al. |
| 2007/0148000 | A1 | | 6/2007 | Marusko et al. |

* cited by examiner

METHOD OF FABRICATING A TURBINE ENGINE BLADE OUT OF COMPOSITE MATERIAL

The present invention relates to a method of fabricating a turbine engine blade out of composite material, and also to a mold for performing such a method.

More particularly, the invention provides a method of fabricating a fan blade.

Such a blade conventionally presents a root and an airfoil, the root having oblique side faces that are connected to the airfoil and that serve to form bearing surfaces for bearing against an assembly slot in a rotor disk.

The large dimensions of a fan blade generally make it necessary to use lightweight materials in order to avoid penalizing the performance of the turbojet.

A fan blade is also subjected to particularly high levels of stress at its root, in particular via the bearing surfaces.

The forces exerted on the stream of air by the airfoil, in the radially outer zone thereof, give rise to considerable stresses in the fastening zone of the blade, i.e. in the blade root, as a result of the considerable length of the airfoil.

This leads to making use of a material that is both light in weight and strong for use in fabricating the blade.

The use of a composite material provides a solution to these various constraints.

It is thus known to make a blade out of a preform that is formed by weaving fibers, said fibers being compacted and embedded in a matrix of thermosetting resin. The fibers thus provide a mechanical reinforcing function, while the resin matrix holds the blade together.

Documents EP 1 526 285, in the name of the Applicant, and U.S. Pat. No. 2,746,514 describe methods of fabricating a preform by three-dimensionally weaving fibers, in particular carbon fibers.

The preform as obtained in that way has a root portion and an airfoil portion that are connected together by oblique side faces for forming bearing surfaces enabling the root to bear against an assembly slot in a rotor disk.

As described in document EP 1 777 063, also in the name of the Applicant, the preform is then arranged in a mold having a cavity with a root zone and an airfoil zone, which zones are connected together by oblique side faces corresponding to the above-mentioned side faces of the preform.

The relaxing of the fibers after the preform has been woven gives rise to an expansion of the preform. The preform then presents dimensions that are greater than the dimensions of the part that is to be made.

The preform is initially compacted in the mold, by moving two shells towards each other in a direction that is transverse relative to the longitudinal axis of the blade, and by pressing a movable portion against the end of the preform root. This movable portion serves to constrain the fibers of the preform root to become pressed against the oblique faces of the mold.

A partial vacuum is then established inside the mold and then a thermosetting resin is injected into the mold so as to impregnate the entire preform.

The preform and the resin are then heated so as to cause the resin to polymerize, and thus harden. The fibers are then held in position by the resin matrix and the matrix and the fibers together form a blade that is simultaneously lightweight, rigid, and hard.

Pressing the fibers of the preform against the oblique side faces of the mold serves to limit any gaps in these zones that are to form the bearing surfaces of the root for bearing against an assembly slot in a rotor disk.

After the resin has been injected, the existence of numerous gaps leads to the appearance of clumps or pockets of resin that are mechanically weak. Since the bearing surfaces are zones that are subjected to high levels of stress, it is necessary to limit the appearance of such clumps or pockets of resin. This is achieved in the conventional method by pressing the movable portion against the root of the preform.

Nevertheless, such a method gives rise to weaknesses in the blade root.

The longitudinal force applied by the movable portion against the fibers tends to cause them to buckle. However, in order to ensure that a fiber conserves good mechanical properties, it is necessary for it to extend substantially longitudinally. Buckling of a fiber gives rise to zones having waves or irregularities that decrease the mechanical strength of the corresponding portions of the blade. Unfortunately, as mentioned above, the bearing surfaces of the blade root are zones that are subjected to the highest levels of stress.

Furthermore, such a method makes it necessary firstly to move one mold shell transversely relative to the other mold shell in order to compress the preform transversely, and secondly to exert a longitudinal force on another movable portion. Performing such a fabrication method complicates making the mold and increases the costs of the mold.

A particular object of the invention is to provide a solution to this problem that is simple, effective, and inexpensive.

To this end, the invention provides a method of fabricating a turbine engine blade out of composite material, the method consisting in:

making a preform by three-dimensional weaving of yarns, said preform comprising a blade root portion and a blade airfoil portion, which portions are connected together by oblique side faces that are to form bearing surfaces enabling the blade root to bear against an assembly slot in a rotor disk;

compacting the preform in a mold having a cavity with a root zone and an airfoil zone connected together by first oblique side faces corresponding to the above-mentioned side faces of the preform; and vacuum injecting a resin into the mold in order to impregnate the entire compacted preform and form a rigid blade after polymerization of the resin;

the method being characterized in that it also consists in forming second oblique faces in the mold that bear against the root portion of the preform and that present angles of inclination opposite to the angles of inclination of the first oblique side faces in such a manner that during compacting of the preform, the movement of a wall of the mold in a transverse direction tending to reduce the thickness of the preform gives rise to compression of the root portion of the preform in a longitudinal direction tending to urge the yarns of the preform against the first oblique side faces of the cavity of the mold while avoiding buckling of these yarns.

In this way, moving a portion of the mold in a single direction serves both to compact the preform transversely and to exert sufficient longitudinal force on the root for the fibers of the oblique side faces of the root to press against the first oblique faces of the mold, with this serving to limit the appearance of clumps or pockets of resin in the bearing surfaces.

In addition, such a method avoids fibers buckling in the blade root, thereby increasing the mechanical strength of the blade.

According to a characteristic of the invention, the method consists in blocking the longitudinal end of the root of the preform in the mold to prevent it from moving longitudinally in the direction away from the airfoil portion.

In addition, the method includes a step of trimming the blade after polymerization of the resin, in order to form its final outline.

The preform is initially overdimensioned so that a finishing step can be performed by trimming. This operation serves to improve the surface states of the blade and guarantees that the required dimensions are complied with.

According to a possibility of the invention, the preform is positioned in the cavity with the help of reference yarns of the preform and of marks arranged on the wall of the cavity, in particular at the first oblique side faces. The preform may thus be put into place in the mold both simply and accurately.

The invention also provides a mold for executing the method of the invention from a preform made by three-dimensional weaving of yarns, the mold comprising two shells defining a cavity for receiving the preform, the cavity having a root zone and an airfoil zone that are connected together by first oblique side faces that slope relative to the join plane of the shells, the first oblique side faces converging towards each other going towards the airfoil zone, and means for moving the two shells towards each other to enable the preform to be compacted, the mold being characterized in that the cavity includes second oblique side faces sloping relative to the join plane and diverging from each other going towards the airfoil zone, the second oblique side faces being formed between the end of the root zone and the first oblique faces such that moving the two shells towards each other gives rise to compression of the preform in the root zone in a longitudinal direction tending to urge the yarns of the preform against the first oblique side faces of the cavity of the mold while avoiding buckling of the yarns.

As mentioned above, the first oblique faces of the mold serve to define bearing surfaces of the blade root, while the second oblique surfaces serve to press the fibers of the blade root against the first oblique faces of the mold. The mold, which is simpler in design than the prior art mold, has only two shells that need to be moved towards each other. In particular, the mold does not have any additional moving member for moving longitudinally in order to compact the root portion of the preform.

Preferably, each of the second oblique side faces is inclined relative to the join plane at an angle lying in the range 2° to 60°, and preferably of the order of 50°.

Such an angle guarantees that the fibers are pressed sufficiently against the first oblique side faces, but without that leading to buckling of the fibers.

Exceeding this value may give rise to a small amount of buckling of these fibers, thereby reducing the mechanical strength of the blade root.

In addition, a smaller angle does not enable the fibers to be pressed correctly against the first oblique side faces, such that clumps or pockets of resin may form in the bearing surfaces, thereby also having the effect of reducing the strength of the blade.

According to a characteristic of the invention, each of the first oblique side faces is inclined relative to the join plane at an angle of the order of 60°.

This angle corresponds to the angle of the bearing surfaces that are conventionally provided in the assembly slots in a rotor disk.

Advantageously, each of the second oblique side faces is formed by a wedge mounted on the corresponding shell.

This makes it possible to adapt molds that are presently in use for fabricating prior art blades, merely by mounting said wedges therein.

Naturally, the second oblique side faces may also be formed integrally with the shells.

According to a possibility of the invention, the mold includes a stationary plate defining the free end of the root zone of the cavity.

Preferably, the mold includes adjustment means for adjusting the angle of inclination of each of the second oblique side faces.

Such a characteristic makes it possible to adapt the angles of inclination of the second oblique side faces as a function of the application.

In an embodiment of the invention, each of the second oblique side faces is formed by a wedge pivotally mounted relative to the corresponding shell, the angle of inclination of said face being adjusted by pivoting said wedge.

The pivoting of the wedge may be controlled by an adjustment screw.

The invention can be better understood and other details, characteristics, and advantages of the invention appear on reading the following description made by way of non-limiting example and with reference to the accompanying drawings, in which:

FIG. 1 shows a preform 1 for a turbine engine fan blade obtained by three-dimensional weaving of yarn, e.g. by a method such as that described in document EP 1 526 285.

The preform 1 has warp yarns extending in the longitudinal direction of the preform, and weft yarns.

Said preform 1 comprises a blade root portion 2 and a blade airfoil portion 3 that are connected together by oblique side faces 4 of the root that serve to form bearing surfaces for bearing against a mounting slot in a rotor disk.

The oblique side faces 4 are arranged facing each other, converging from the root portion 2 towards the airfoil portion 3. These faces 4 thus define a zone in which the preform tapers from the root portion 2 towards the airfoil portion 3.

The yarns are constituted by twisted carbon fibers, glass fibers, silica fibers, silicon carbide fibers, alumina fibers, aromatic fibers, and/or aromatic polyamide fibers.

Figure 1:
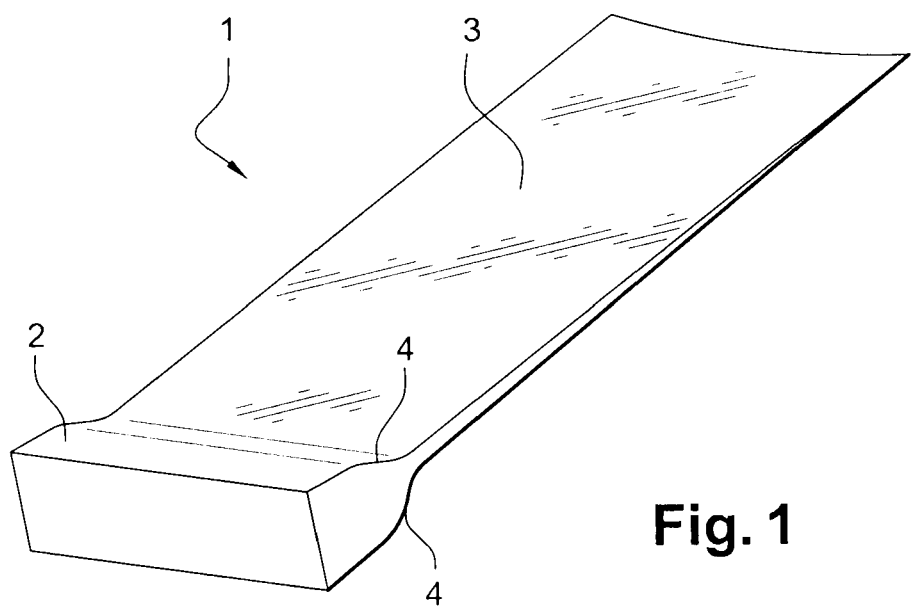
FIG. 1 is a diagrammatic perspective view of a conventional preform.

In the state shown in FIG. 1, i.e. in its non-stressed or non-compressed state, the preform 1 presents a certain amount of expansion, due to the yarns relaxing. The volume of the preform 1 is thus greater than the volume of the part that is to be made.

The preform 1 is then placed in a mold 5 in which the cavity corresponds substantially to the general shape of the preform 1, i.e. it has a root zone 6 and an airfoil zone 7 that are connected to each other by oblique side faces 8 corresponding to the above-mentioned oblique side faces 4 of the preform 1.

More particularly, the mold 5 comprises two shells 9 that are assembled together at a join plane A, and it presents an open end 10 at the root zone 6.

Each end 10 is closed by an end plate 11 with the rod 12 of an actuator passing therethrough. The rod 12 extends longitudinally along the join plane. The free end of the rod 12 penetrates into the cavity and supports a piston 13 suitable for moving in the longitudinal direction within the root zone 6, towards the airfoil zone 7.

The method of fabricating a fan blade from the above-mentioned preform 1 is as follows.

Such a method is described in detail in particular in document EP 1 777 063.

Firstly, the preform 1 is placed in a first shell 9 of the mold 5. The preform 1 may be provided with reference yarns, it being possible for each shell to be provided with corresponding markings, thereby making it easier to position the preform 1 in the shell 9.

Thereafter, the second shell 9 is positioned facing the first shell and the preform 1, with the preform 1 being compressed transversely by moving the two shells 9 together. Specifically, one of the shells is stationary and the other shell is movable and is actuated by a press.

Thereafter, the actuator is actuated so as to move the piston 13 longitudinally. The root portion 2 is then compressed sufficiently to press the oblique side walls 4 of the preform against the oblique side walls 8 of the mold 5 so as to minimize the space that remains between these pairs of walls. A partial vacuum is then established inside the mold 5.

A thermosetting resin, e.g. an epoxy resin, is then injected into the mold 1. More particularly, the resin is injected via the blade root zone 6 over the entire width of the root so as to form a resin front that advances progressively towards the free end of the airfoil zone 7 until all of the fibers are embedded in or impregnated with resin.

The mold 5 is then heated for a certain length of time at a so-called "polymerization" temperature (data provided by the supplier of the resin), until the resin has polymerized completely. During this step, the resin hardens and forms a compact and rigid binder between the fibers.

The part as obtained in this way possesses good mechanical strength because of the yarns, in particular because of the yarns extending along its longitudinal axis, and it also presents good integrity and harness because of the resin.

The part is then trimmed, i.e. machined so as to define the exact outlines of the blade. In particular, the root 2 is machined to form a bulb that is to be received in an assembly slot in a rotor disk. The oblique side faces 4 of the root have bearing surfaces that bear against the disk and they are subjected to high levels of stress while the turbojet is in operation.

The compacting of the root portion 2 of the preform 1 by the piston 13 compresses the longitudinally extending fibers, which may buckle if the stress that is exerted is too high.

As mentioned above, this buckling gives rise to zones of weakness in the blade root 2.

Figure 3:
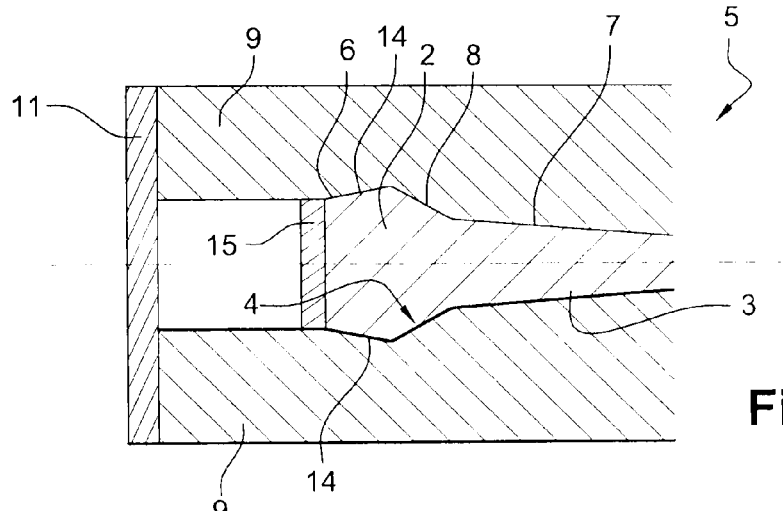
FIG. 3 is a view corresponding to FIG. 2, showing a mold of the invention.
Figure 4:
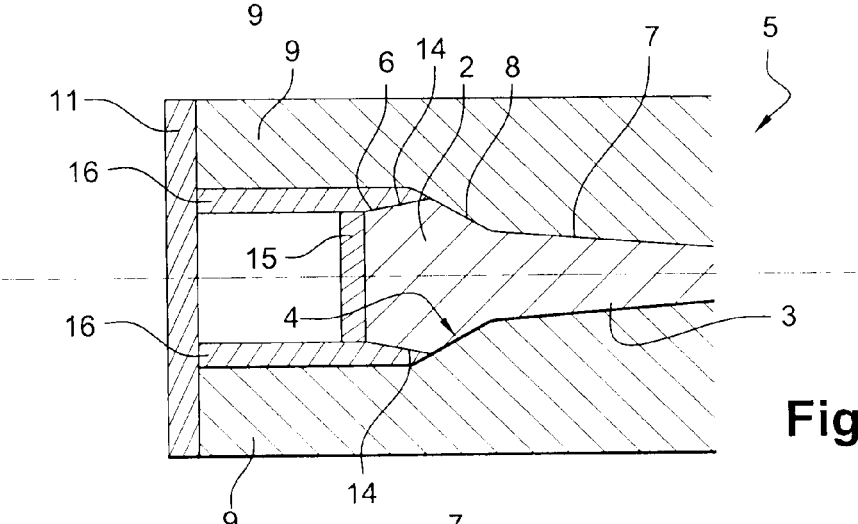
FIG. 4 is a view corresponding to FIG. 3, showing a variant embodiment of the invention.

FIG. 3 shows a mold 5 of the invention. As above, the mold comprises two shells 9 that are assembled together via a join plane A and that form a cavity including a root zone 6 and an airfoil zone 7, which zones are connected together by first oblique side faces 8 forming a section-reduction zone going from the root towards the airfoil.

The mold 5 also includes second oblique side faces 14 sloping relative to the join plane A, these faces diverging from each other going towards the airfoil zone 7, and being formed between the end of the root zone 6 and the first oblique side faces 8.

Each of the first oblique side faces 8 slopes at an angle of about 60° relative to the join plane A.

Each of the second oblique side faces 14 slopes at an angle lying in the range 2° to 60°, preferably of the order of 50°, relative to the join plane A.

These angles may optionally vary as a function of the application.

The mold 5 further includes a stop wall 15 arranged at the free end of the blade root zone 6.

This wall 15 may be made of an element that is distinct from the shells 9 or it may be integrally molded with one and/or the other of the shells 9.

The method of the invention for making a blade consists in placing the preform 1 in a first shell 9 of the mold 5. As above, the preform 1 may be provided with reference yarns and each shell may be provided with corresponding marks so as to facilitate positioning the preform 1 in the shell 9.

The second shell is then positioned facing the first shell and the preform, with the preform being compressed transversely by moving the two shells 9 towards each other. Specifically, one of the two shells may be stationary and the other one may be movable and actuated by a press.

As the two shells 9 move towards each other, the second oblique faces 14 come to bear against the root portion 2 of the preform 1. Their angle of inclination opposite to that of the first oblique side faces 8 causes the root portion 2 of the preform 1 to be compressed in a longitudinal direction tending to urge the yarns of the preform 1 against the first oblique side faces 8 of the cavity of the mold 5 while avoiding buckling of these yarns.

The longitudinal end of the root portion 2 of the preform 1 is blocked by the stop wall 15, such that it is prevented from moving longitudinally away from the airfoil portion 3.

In the same manner as above, a partial vacuum is established inside the mold 5 and then a thermosetting resin, e.g. an epoxy resin, is injected into the mold 5 via the blade root zone 6 over the entire width of the root, thereby forming a resin front that advances progressively towards the free end of the airfoil zone 7 until all of the fibers are embedded in or impregnated with the resin.

The mold 5 is then heated and maintained at a so-called "polymerization" temperature (data provided by the supplier of the resin), until the resin has polymerized completely. Finally, a trimming operation serves to define the final outlines of the blade by machining.

Such a method enables the oblique faces 4 of the preform 1 to be pressed correctly and simply against the first oblique faces 8 of the mold 5 in such a manner as to avoid any clumping of resin after the part has been fabricated, while also avoiding any buckling of the fibers in the blade root 2.

It should be observed that moving only one of the shells (the movable shell) makes it possible both to compact the preform 1 transversely and to exert a longitudinal force on the fibers that is sufficient for them to be pressed against the first oblique faces 8 of the mold 5, so as to form the bearing surfaces.

The positions and the angles of inclination of the second oblique faces 14 also serve to avoid or to limit any buckling of the fibers in the root portion 2 of the preform 1.

In particular, the angles of inclination of these faces 14 should be sufficient to ensure that the component of the force that is generated along the longitudinal axis A is sufficient to press the preform 1 firmly against the first oblique faces 8 of the mold 5 while being small enough to avoid generating buckling.

The uniformity of the part may subsequently be verified by tomography. Such verification serves to reveal the possible presence of pockets or lumps of resin, in particular in the blade root portion 2.

In the above-described embodiment, each of the second inclined faces 14 is formed integrally with the corresponding shell 9.

Figure 2:
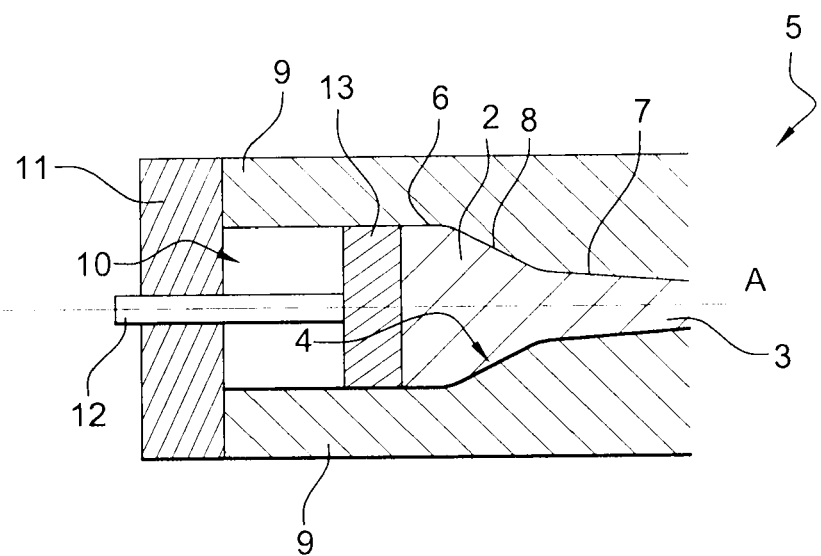
FIG. 2 is a diagrammatic section view of a prior art mold.

It is also possible to adapt a conventional mold, of the kind shown in FIG. 2, by fitting a wedge 16 on each of the shells, each wedge 16 defining one of the second oblique faces 14.

Figure 5:
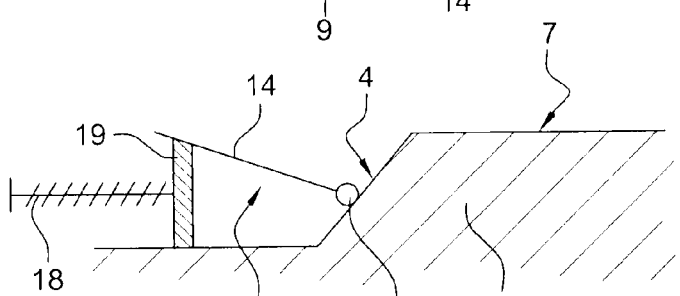
FIG. 5 is a diagrammatic view of a shell of a mold of the invention that is fitted with means for adjusting the angle of inclination of the second oblique side face.
Figure 6:
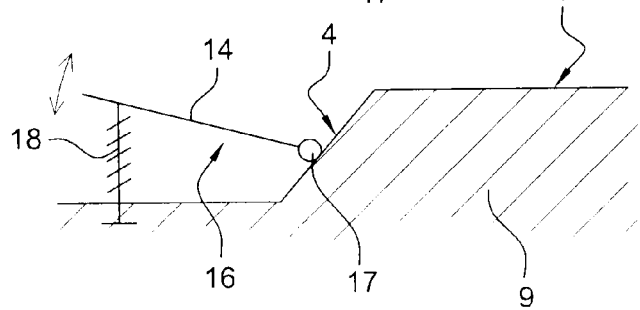
FIG. 6 is a view corresponding to FIG. 5, showing a variant embodiment of the invention.

In one possibility of the invention, as shown in FIGS. 5 and 6, each shell 9 is fitted with means for adjusting the angle of inclination of the corresponding second oblique face 14.

Under such circumstances, each of the second oblique faces 14 may be formed by a wedge 16 that is mounted to pivot relative to the corresponding shell 9 about an axis 17, with the angle of inclination of said face 14 being adjusted by pivoting said wedge 16.

The pivoting of the wedge 16 may be controlled by an adjustment screw 18 that extends longitudinally and that has its end fitted with a bearing member 19, as shown in FIG. 5.

The free end of the wedge 14, facing towards the end of the root zone 6 away from the axis of rotation 17 bears against the member 19. The dimensions of the bearing member 19 are adjusted so that turning the screw 18 causes the member 19 to move longitudinally, thereby pivoting the wedge 16 that rests thereagainst through a selected range of angles of inclination.

In another possibility of the invention, as shown in FIG. 6, the wedge 16 is actuated by an adjustment screw 18 that extends transversely, the free end of the wedge 16 bearing against the free end of the screw 18.

Thus, when the screw 18 is turned, it moves transversely, thereby driving pivoting of the wedge 16 that is resting thereagainst through a selected range of angles of inclination.

The invention claimed is:

1. A method of fabricating a turbine engine blade out of composite material, the method comprising:
    making a preform by three-dimensional weaving of yarns, said preform comprising a blade root portion and a blade airfoil portion, which portions are connected together by oblique side faces that are to form bearing surfaces enabling the blade root to bear against an assembly slot in a rotor disk;
    compacting the preform in a mold having a cavity with a root zone and an airfoil zone connected together by first oblique side faces corresponding to the above-mentioned side faces of the preform; and
    vacuum injecting a resin into the mold in order to impregnate the entire compacted preform and form a rigid blade after polymerization of the resin;
    wherein the method further comprises forming second oblique faces in the mold that bear against the root portion of the preform and that present angles of inclination opposite to the angles of inclination of the first oblique side faces in such a manner that during compacting of the preform, movement of a wall of the mold in a transverse direction tending to reduce a thickness of the preform gives rise to compression of the root portion of the preform in a longitudinal direction tending to urge the yarns of the preform against the first oblique side faces of the cavity of the mold while avoiding buckling of these yarns.

2. The method according to claim 1, further comprising blocking the longitudinal end of the root of the preform in the mold to prevent it from moving longitudinally in the direction away from the airfoil portion.

3. The method according to claim 1, further comprising trimming the blade after polymerization of the resin, in order to form its final outline.

4. The method according to claim 1, wherein the preform is positioned in the cavity with the help of reference yarns of the preform and of marks arranged on the wall of the cavity, including marks at the first oblique side faces.

5. A mold for fabricating a turbine engine blade out of composite material with a preform made by three-dimensional weaving of yarns, the mold comprising:
    two shells defining a cavity for receiving the preform, the cavity having a root zone and an airfoil zone that are connected together by first oblique side faces that slope relative to a join plane of the shells, the first oblique side faces converging towards each other going towards the airfoil zone; and
    means for moving the two shells towards each other to enable the preform to be compacted,
    wherein the cavity includes second oblique side faces sloping relative to the join plane and diverging from each other going towards the airfoil zone, the second oblique side faces being formed between an end of the root zone and the first oblique faces such that moving the two shells towards each other gives rise to compression of the preform in the root zone in a longitudinal direction tending to urge the yarns of the preform against the first oblique side faces of the cavity of the mold while avoiding buckling of the yarns,
    wherein each of the second oblique side faces is inclined relative to the join plane at an angle lying in the range 2° to 60°, and
    wherein said mold further comprises adjustment means for adjusting the angle of inclination of each of the second oblique side faces.

6. The mold according to claim 5, wherein each of the first oblique side faces is inclined relative to the join plane at an angle of the order of 60°.

7. The mold according to claim 5, wherein each of the second oblique side faces is formed by a wedge mounted on the corresponding shell.

8. The mold according to claim 5, further comprising a stationary plate defining the free end of the root zone of the cavity.

9. The mold according to claim 5, wherein each of the second oblique side faces is formed by a wedge pivotally mounted relative to the corresponding shell, the angle of inclination of said face being adjusted by pivoting said wedge.

10. The mold according to claim 9, wherein the pivoting of the wedge is controlled by an adjustment screw.

11. The mold according to claim 5, wherein each of the second oblique side faces is inclined relative to the join plane at an angle of the order of 50°.

12. The mold according to claim 5, wherein each shell includes a continuous inner wall forming said airfoil zone, said first oblique side faces, said second oblique side faces and said root zone.

* * * * *